Sept. 15, 1931.  W. S. OSWALD  1,823,333
MEANS FOR KEYING PUNCHINGS
Filed Dec. 17, 1929   2 Sheets-Sheet 1
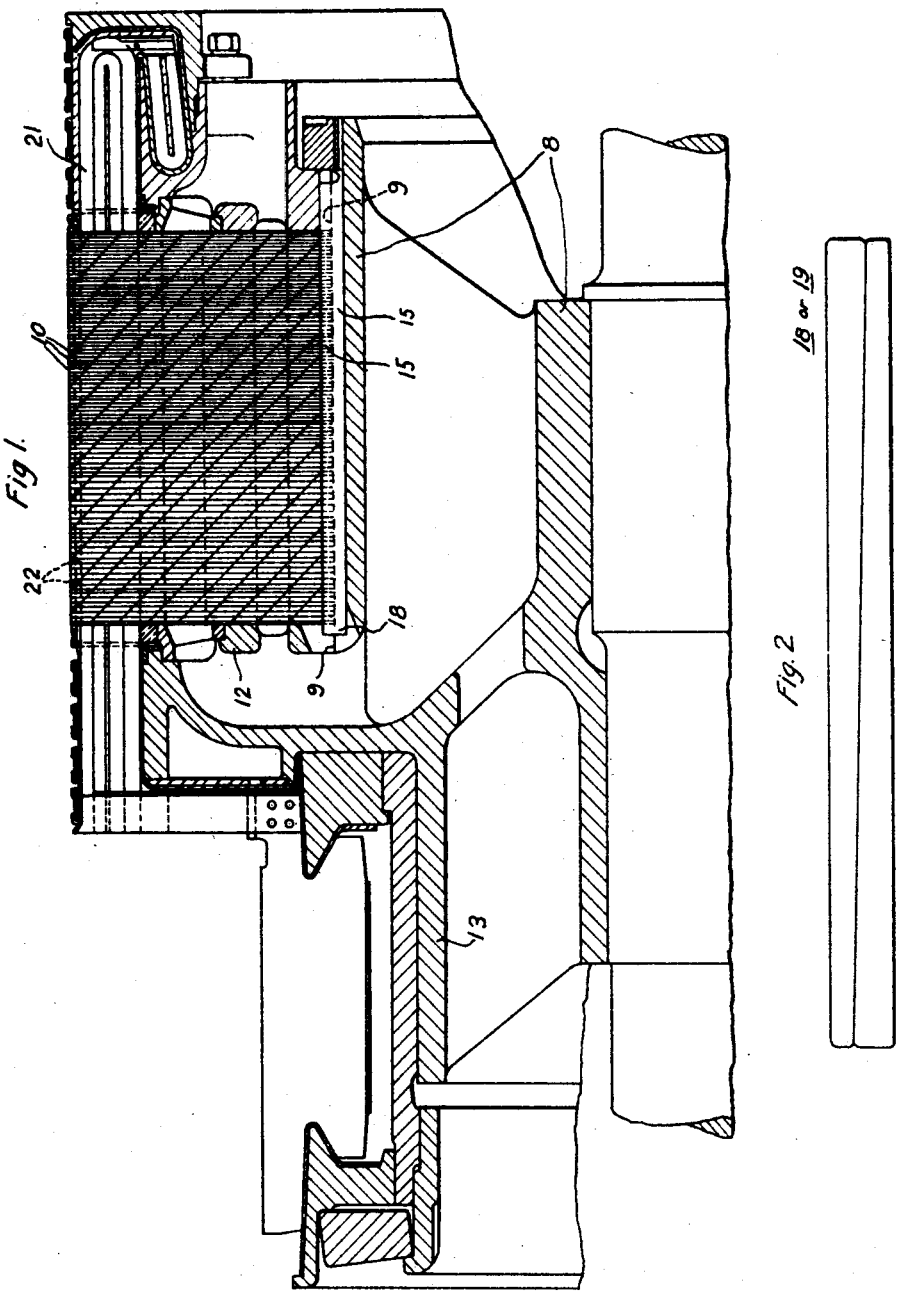
INVENTOR
William S. Oswald
BY
ATTORNEY

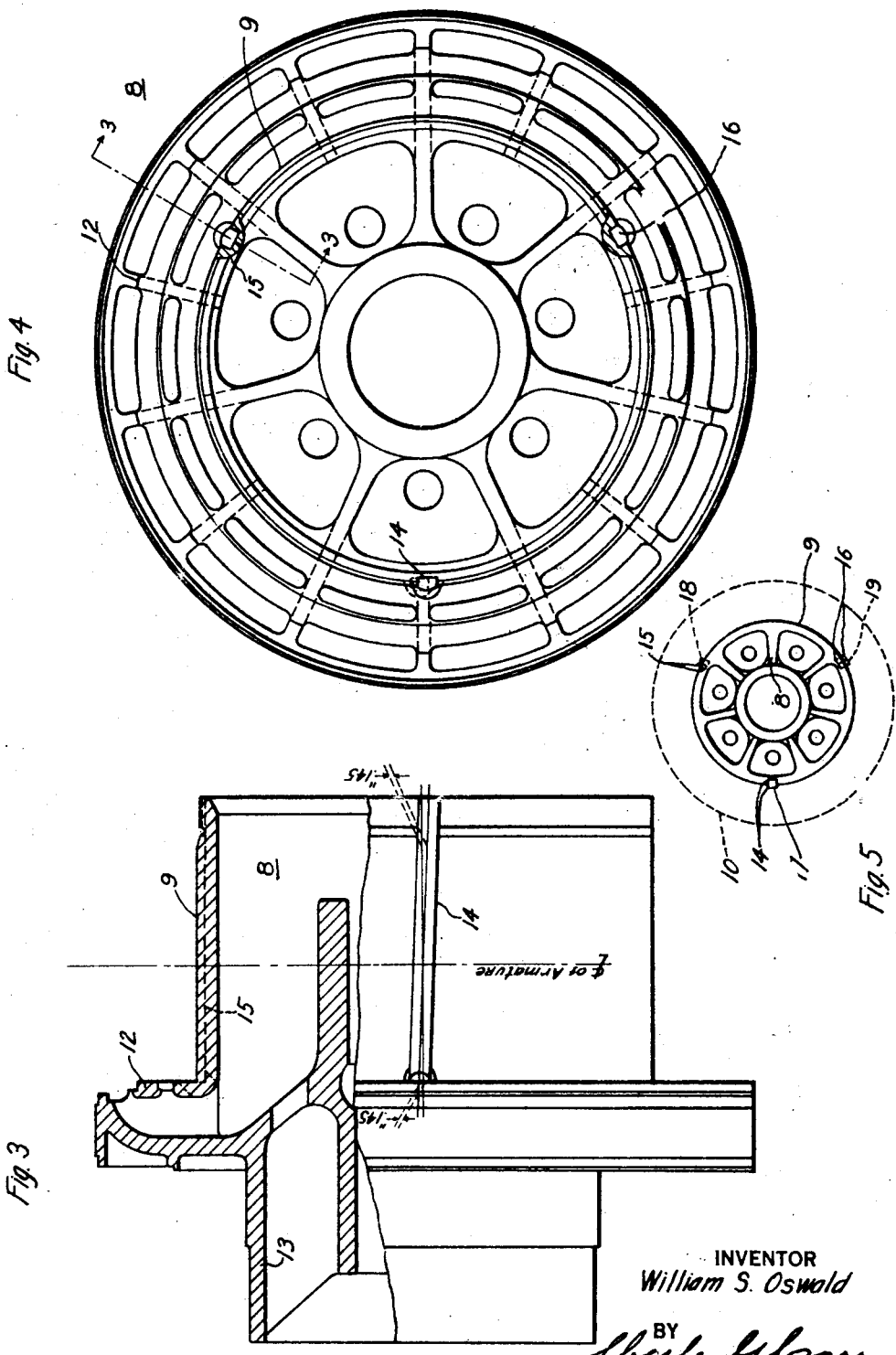

Patented Sept. 15, 1931

1,823,333

UNITED STATES PATENT OFFICE

WILLIAM S. OSWALD, OF WILKINSBURG, PENNSYLVANIA, ASSIGNOR TO WESTINGHOUSE ELECTRIC & MANUFACTURING COMPANY, A CORPORATION OF PENNSYLVANIA

MEANS FOR KEYING PUNCHINGS

Application filed December 17, 1929. Serial No. 414,695.

My invention relates to means for keying the punchings to the spider of the rotor of a dynamo-electric machine in such manner that a tight, torque-transmitting driving connection is maintained between the armature core and the supporting spider therefor, in a dynamo-electric machine such as a single-phase commutator railway motor.

My invention consists in a specific arrangement of slots and keys which will be hereinafter described and claimed with reference to the accompanying drawings, wherein Figure 1 is a longitudinal sectional view of the top half of the rotor of a single-phase commutator motor embodying my invention, Fig. 2 is a plan view of one of the two-part wedge keys, Fig. 3 is a side elevational view, partly in section on the line 3—3 of Fig. 4, showing the supporting spider of the rotor shown in Figure 1, Fig. 4 is an end elevational view of the part shown in Fig. 3, and Fig. 5 is a detail view illustrating the manner of assembling the punchings.

My invention relates to the assembling and construction of certain of the rotor parts of an otherwise conventional dynamo-electric machine. As shown in Figure 1, the rotor comprises, inter alia, a spider 8 having a cylindrical outer peripheral surface 9 which supports the annular steel core punchings 10. The spider 8 is provided with a radial flange or abutment 12 for the inner end of the core, and is also provided with a commutator-supporting cylindrical spider-extension 13.

In motors such as the one illustrated, utilizing annular core punchings, or so-called "solid ring" punchings, (to distinguish them from segmentary punchings), mounted on a solid cylindrical spider having a continuous cylindrical peripheral surface as illustrated in the drawings, it is necessary to so grind the outer peripheral surface 9 that the punchings 10 go on with an iron-to-iron fit; that is, having about the same diameter within −.000 inch +.001 inch.

The inner peripheries of the punchings 10 and the outer peripheral portion 9 of the spider are provided with a plurality of keyway slots 14, 15 and 16 adapted to receive three keys 17, 18 and 19 for transmitting the driving torque of the motor.

The rotor core punchings 10 support a peripherally disposed armature winding 21 which is disposed in the usual peripheral slots 22 in the rotor punchings. These winding-slots 22 are almost universally skewed, particularly in single-phase railway motors, and in order to attain this skewing, with punchings which are all punched from the same dies, it is necessary to have the keyway-slots 14, 15, 16 of the spider skewed to correspond with the desired skewing of the conductor-slots 22 of the rotor core, as indicated in Fig. 3, wherein the central line of the keyway slot of the spider is skewed or displaced by a distance of .145 inch at each end of a rotor core member which is 11 inches in axial length and 22½ inches in diameter.

Heretofore, it has been customary to utilize only one keyway-slot and one key, the punchings 10 being assembled by turning the spider on end, with its core-abutment 12 at the bottom, and dropping the punchings in place one by one, sliding them over the peripheral surface 9 of the spider and over the single key. The fit between this key and the single keyway-slot of the punchings has been an iron-to-iron fit, so that the punchings would slide down into place when carefully held in horizontal position on the finger-tips and slightly jiggled as they slide down into place.

With such a construction, as utilized in the prior art, it has been found that the close fit between the keyway-slot of the punchings and the key, and between the inner peripheries of the annular punchings and the outer peripheries of the spider, would become impaired, in time, with the result that the punchings would have one or two thousandths of an inch of independent lateral play, eventually bringing about failure of the machine. This difficulty has been true of armatures of the type having solid ring punchings on a solid cylindrical spider, and it has been particularly true of the skewed-slot motor, because when a rectangular cross-sectioned key is placed in a skewed keyway-slot in the spider, the key, in order to make a really accurate fit, should be bent in an elliptical arc in order to fit over the periphery of the spider, and in addition to this, each end of the key should be twisted through a small angle in order that the sides of the key may remain radial.

For practical purposes, it has been necessary to utilize straight skewed keyway-slots on the spider member, in order that the same may be readily machined, and to utilize straight rectangular-sectioned keys. This has necessitated the filing of the ends of the keys, in order to ease off three or four thousandths of an inch, to compensate for the non-radial side which projects too far at each end of the key, and it has also been customary to similarly ease off the projecting top corner of the keys, at each end, although this last-mentioned operation is not as necessary as the first, because there is usually plenty of clearance at the tops of the keyway-slots in the punchings.

With the prior construction just described, it will now be observed that the end punchings, at least, have an extremely poor fit on the top portions of the keys, resulting in the difficulties hereinabove described.

According to my invention, I assemble the punchings, as has heretofore been the practice, utilizing a single solid key 17 as indicated in full lines in Figure 5. After the punchings 10 are all assembled, as indicated in dotted lines in Figure 5, I insert two split keys 18 and 19 in the two remaining registering keyway-slots 15 and 16, each split key being made in two wedge-shaped parts disposed so as to become wedged in the keyway slots in a circumferential direction, making a tight wedge fit with the side or radial walls of the slots. This is done by dropping the thick end of wedge-shaped halves of each of the split keys into the slot, then driving home the other half, and finally spot-welding the two halves so as to prevent displacement.

By the use of my invention as described above, I am enabled to cause each portion of the two split keys to be forced into tight wedging engagement with the side walls of the respective keyway-slots of each of the punchings, thereby securing a tight fit which could not otherwise be obtained, without costly machining operations and the hand scraping of each of the slots. It will be noted that I secure the tight driving fit in a construction utilizing punchings of only ordinary accuracy of configuration, without necessitating any special parts or equipment other than the two split keys.

I claim as my invention:

1. A dynamo-electric machine of the type having a laminated rotor core composed of annular steel punchings, peripherally disposed windings extending through peripheral slots on said rotor core, and a rotor spider for supporting said rotor punchings and adapted to transmit rotational torque to or from the same, characterized by the fact that the inner peripheries of the rotor punchings and the corresponding supporting surface of the rotor spider have a plurality of keyway-slots, the spider keyway-slots being skewed, and a plurality of keys for said slots, and further characterized by the fact that at least all but one of said keys are made in two wedge-shaped parts disposed so as to wedge in a circumferential direction.

2. A dynamo-electric machine of the type having a laminated rotor core composed of annular steel punchings, peripherally disposed windings extending through peripheral slots on said rotor core, and a rotor spider for supporting said rotor punchings and adapted to transmit rotational torque to or from the same, characterized by the fact that the inner peripheries of the rotor punchings and the corresponding supporting surface of the rotor spider have a plurality of keyway-slots, the spider keyway-slots being skewed, and a plurality of keys for said slots, and further characterized by the fact that one of said keys is solid and another of said keys is made in two-wedge-shaped parts disposed so as to wedge in a circumferential direction.

In testimony whereof, I have hereunto subscribed my name this 9th day of December 1929.

WILLIAM S. OSWALD.